(No Model.)

W. P. YOUNG.
CAR FENDER.

No. 552,655. Patented Jan. 7, 1896.

WITNESSES:
P. F. Eagle
L. Douville.

INVENTOR
William P. Young
BY
ATTORNEY.

ANDREW B GRAHAM. PHOTO-LITHO. WASHINGTON, D.C.

UNITED STATES PATENT OFFICE.

WILLIAM P. YOUNG, OF POTTSTOWN, PENNSYLVANIA.

CAR-FENDER.

SPECIFICATION forming part of Letters Patent No. 552,655, dated January 7, 1896.

Application filed July 18, 1895. Serial No. 556,344. (No model.)

*To all whom it may concern:*

Be it known that I, WILLIAM P. YOUNG, a citizen of the United States, residing at Pottstown, in the county of Montgomery, State of Pennsylvania, have invented a new and useful Improvement in Car-Fenders, which improvement is fully set forth in the following specification and accompanying drawings.

My invention consists of a fender which is connected with an oscillating cradle, said fender being adapted to direct the person or object struck to said cradle, the latter yielding when the person or object is received into the same so as to prevent material injury thereto, said cradle and fender being readily removable from their supports, the fender having a truss which carries it on the truck, and other advantages are presented, as will be hereinafter set forth.

Figure 1:
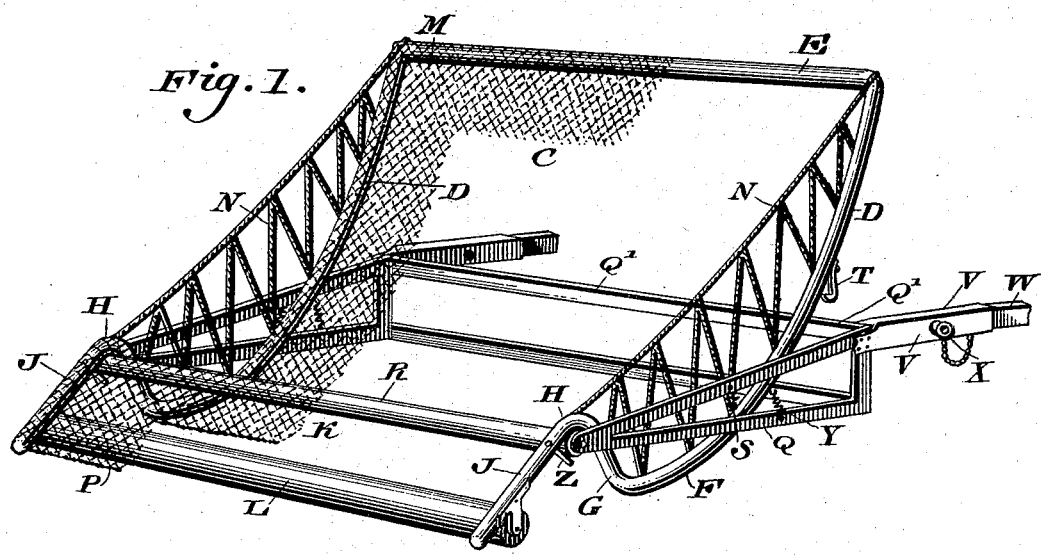
Figure 2:
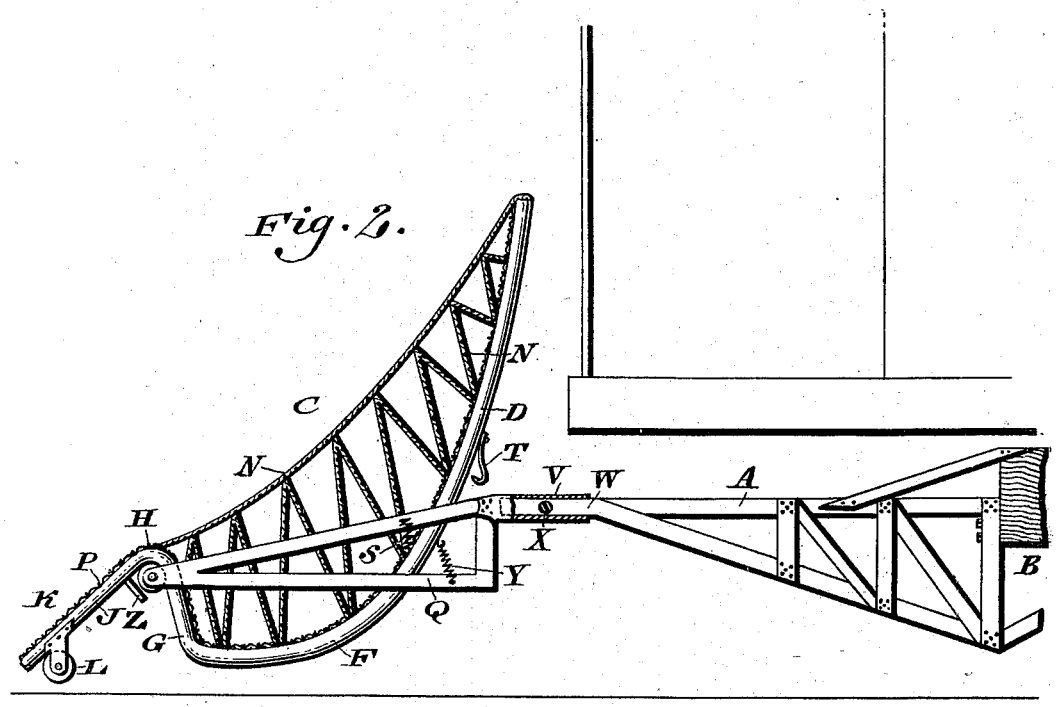

Figure 1 represents a perspective view of a car-fender embodying my invention. Fig. 2 represents a side elevation thereof, showing also means for connecting the device with the truck of a car.

Similar letters of reference indicate corresponding parts in the two figures.

Referring to the drawings, A designates a truss, which is secured to a portion of the truck or running-gear B of the car and projects forwardly therefrom under the platform, and is properly braced so as to be sufficiently strong for the purpose intended.

C designates a cradle or basket, which is formed of the side pieces D and cross-piece E, said side pieces being curved downwardly, as at F, and then upwardly, as at G, and have at their forward ends the bends or knuckles H. Extending forwardly and downwardly from said knuckles are the side pieces J of the fender proper K, on the under side of which is a roller L, whose shaft connects said side pieces J. The cradle is provided with suitable netting M, which is secured to the side and cross piece, and is also provided with the side guards N, formed of ropes or other suitable material, secured to the side pieces in any suitable manner. The fender K is also provided with a suitable netting P, which is secured to the side pieces J in any desirable manner.

Q designates an open frame, which is supported on the forward end of the truss A, the same receiving the lower portion of the cradle C, and having at its front end the roller or cross-bar R, on which the knuckles H of the cradle are mounted as the axis of said cradle, it now being noticed that the cradle may oscillate on said roller or cross-bar, thus permitting the fender K to rise and fall as occasioned.

Connected with the sides of the frame Q are springs S, which are also attached to the side pieces of the cradle C, the tendency of the same being to hold the cradle, and consequently the fender, in primary elevated condition, said spring yielding when the cradle is subjected to the weight of a person or object received by the same, so as to prevent injury, or material injury, to said person or object and the cradle. On the side pieces of the cradle are laterally-projecting studs, bolts or catches T, which, when the cradle is lowered, are adapted to automatically engage the cross-piece Q' of the frame Q, so as to hold the cradle in lowered position when occupied by a person or object thrown thereinto.

Projecting rearwardly from the frame Q, on the sides thereof, are sockets V, which are adapted to receive the rods or bars W on the forward end of the truss A, or vice versa, by which provision the device is held on said truss, and may be removed so as to be applied at the other end of the car when the latter is run in the opposite direction.

In order to retain the arms within the sockets, I employ pins, bolts or other catches X, which are passed through the sockets into or through the arms, the effect of which is evident.

The operation is as follows: When the parts are in the position seen in Fig. 2, the fender K is held somewhat above the rails, so as not to be obstructed by the same. Should a person or object be in the path of the car when he is struck by the fender K, the latter receives the superimposed weight thereon, and so quickly lowers, and the person is directed upwardly by said fender as a chute or deflector into the cradle, which then lowers owing to the weight therein. The catch T engages with the frame Q, and holds the cradle in lowered position, thus preventing the person from rolling forwardly out of the cradle.

When the person or object is removed, the catch T may be disengaged from the frame, and the springs S then become operative and raise the cradle and lower the fender to their operative positions.

It will be noticed that the device is of strong, durable, not complicated, and inexpensive construction, it being also noticed that when the springs S are disengaged from the cradle the latter may be lifted out of the frame Q, when so required, and afterward restored into said frame, the knuckles H being rested on the roller or cross-bar R, and the springs S are then re-attached to the cradle, whereby the parts of the device are again in operative condition.

In order to balance the cradle or counteract the lifting tendency of the springs S, I attach to the frame Q and the cradle C the springs Y, whose tendency is to draw down the cradle, resisted, however, by said springs S.

In order to prevent the fender from upward displacement when struck in front by any object on the track or road bed, there are secured to the side pieces J of the fender the pins Z, which depend from the same in such manner as to project partly under the roller or cross-bar and thus act as a guard for preventing the knuckles from leaving their seats without, however, interfering with the proper removal of the fender and cage from the frame Q when so required.

It will be seen that owing to the truss A as a support for the fender there will be a more nearly uniform elevation of the latter from the track, and the same is allowed to be placed close to the track so as to prevent the object or body struck from passing beneath the fender, it being noticed that the truss is formed of suitable material, of side pieces and braces producing a strong, light and serviceable structure, and the same does not appreciably change its position to the track or road bed, as the truck scarcely oscillates in vertical position, unlike the body of the car, wherefore the forward end of the fender may be maintained at all times close to the track or road bed without materially changing the level thereof.

Having thus described my invention, what I claim as new, and desire to secure by Letters Patent, is—

1. A frame with a cross bar at the front thereof, a fender, a cradle connected with said fender, and knuckles on said fender and cradle intermediate said parts, said knuckles being freely seated on said cross bar, and guards on the fender freely embracing said cross bar, substantially as described.

2. A car fender consisting of a frame with a cross bar at the front thereof, and provided with rearwardly projecting sockets, a cradle having bent sides freely supported at said bends or knuckles on said cross bar, a fender at the front end of said cradle and means substantially as described for keeping said cradle in contact with said cross bar, said parts being combined substantially as described.

3. A frame and a combined fender and cradle, with an intermediate knuckle which is mounted on a cross bar of said frame, in combination with trusses which carry said frame, and are connected with the rigid part of a car truck, said trusses extending forwardly underneath and clear of the body of the car, and being constructed of skeleton form, substantially as described.

4. In a device of the character described, an oscillating fender and cradle, which have a knuckle intermediate of the same, and a frame receiving said cradle, and having a cross bar on which said knuckle is mounted as an axis, in combination with an automatically-acting catch for holding said cradle in depressed position, substantially as described.

WILLIAM P. YOUNG.

Witnesses:
   JOHN A. WIEDERSHEIM,
   R. H. GRAESER.